US012401130B2

(12) United States Patent
Ranjbarnikkhah et al.

(10) Patent No.: US 12,401,130 B2
(45) Date of Patent: Aug. 26, 2025

(54) ANTENNA APERTURE HAVING ANTENNA ELEMENTS WITH STATIC CAPACITORS

(71) Applicant: Kymeta Corporation, Redmond, WA (US)

(72) Inventors: Mohammad Ranjbarnikkhah, Redmond, WA (US); Seyed Mohamad Amin Momeni Hasan Abadi, Redmond, WA (US); Mohsen Sazegar, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 49 days.

(21) Appl. No.: 18/587,794

(22) Filed: Feb. 26, 2024

(65) Prior Publication Data

US 2024/0291158 A1 Aug. 29, 2024

Related U.S. Application Data

(60) Provisional application No. 63/448,875, filed on Feb. 28, 2023.

(51) Int. Cl.

*H01Q 13/10* (2006.01)
*H01Q 1/22* (2006.01)
*H01Q 15/00* (2006.01)

(52) U.S. Cl.

CPC ........... *H01Q 13/10* (2013.01); *H01Q 1/2283* (2013.01); *H01Q 15/0086* (2013.01)

(58) Field of Classification Search

CPC .... H01Q 1/2283; H01Q 1/3233; H01Q 13/10; H01Q 13/103; H01Q 15/0066; H01Q 15/0086

See application file for complete search history.

(56) References Cited

U.S. PATENT DOCUMENTS

| | | | | | |
|---|---|---|---|---|---|
| 5,987,313 | A * | 11/1999 | Lee | H03J 1/0033 455/184.1 |
| 11,223,140 | B2 * | 1/2022 | Lee | H01Q 1/2283 |
| 2008/0290465 | A1 * | 11/2008 | de Vreede | H10D 8/60 333/32 |
| 2010/0090016 | A1 * | 4/2010 | Koyama | G06K 19/07345 235/492 |
| 2015/0318618 | A1 * | 11/2015 | Chen | H01P 7/082 343/750 |
| 2021/0050671 | A1 * | 2/2021 | Stevenson | H01Q 21/0087 |

OTHER PUBLICATIONS

Written Opinion of PCTIB2024051884 (Year: 2024).*

* cited by examiner

*Primary Examiner* — Raymond R Chai

(74) *Attorney, Agent, or Firm* — Womble Bond Dickinson (US) LLP

(57) ABSTRACT

An antenna having radio-frequency (RF) radiating antenna elements with static capacitors are described. In some embodiments, the antenna has RF signal source; a plurality of radio-frequency (RF) radiating antenna elements coupled to the RF signal source, wherein each of the RF radiating antenna elements comprises a slot, a tuning element coupled to the RF signal source and to tune the slot as part of the RF radiating antenna elements generating beams, and a fixed capacitor coupled to the RF signal source and coupled in series with the tuning element across the slot, the fixed capacitor to mitigate harmonic generation in order to control linear response of the plurality of radio-frequency (RF) radiating antenna elements.

20 Claims, 8 Drawing Sheets

ANTENNA APERTURE HAVING ANTENNA ELEMENTS WITH STATIC CAPACITORS

RELATED APPLICATION

The present application is a non-provisional application of and claims the benefit of U.S. Provisional Patent Application No. 63/448,875, filed Feb. 28, 2023, and entitled "ROLE OF MIM IN TX HIGH-POWER MODE", which is incorporated by reference in its entirety.

FIELD OF THE DISCLOSURE

Embodiments of the present disclosure are related to wireless communication; more particularly, embodiments disclosed herein related to antennas (e.g., metasurface antennas, phased array antennas, etc.) that include fixed capacitors coupled to varactors that are used for tuning radio-frequency (RF) radiating antenna elements.

BACKGROUND

A number of electronically steerable antenna exist today. Electronically steerable antennas create beams that can be electronically steered in different directions without physically moving the antenna. These antennas include a number of RF radiating antenna elements that are controlled to generate the beams. One type of antennas antenna is a phased array antenna. In a phased array antenna, phase shifters are used to change the phase or signal delay electronically, thereby steering the beam in different directions.

Metasurface antennas have recently emerged as another example of an electronically steerable antenna for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

In some electronically steerable antennas, the radiating antenna elements include tuning elements to control their operation. These tuning elements can be non-linear devices that tune the antenna elements as part of the process for generating beams with the antenna elements.

SUMMARY

An antenna having radio-frequency (RF) radiating antenna elements with static capacitors are described. In some embodiments, the antenna has RF signal source; a plurality of radio-frequency (RF) radiating antenna elements coupled to the RF signal source, wherein each of the RF radiating antenna elements comprises a slot, a tuning element coupled to the RF signal source and to tune the slot as part of the RF radiating antenna elements generating beams, and a fixed capacitor coupled to the RF signal source and coupled in series with the tuning element across the slot, the fixed capacitor to mitigate harmonic generation in order to control linear response of the plurality of radio-frequency (RF) radiating antenna elements.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
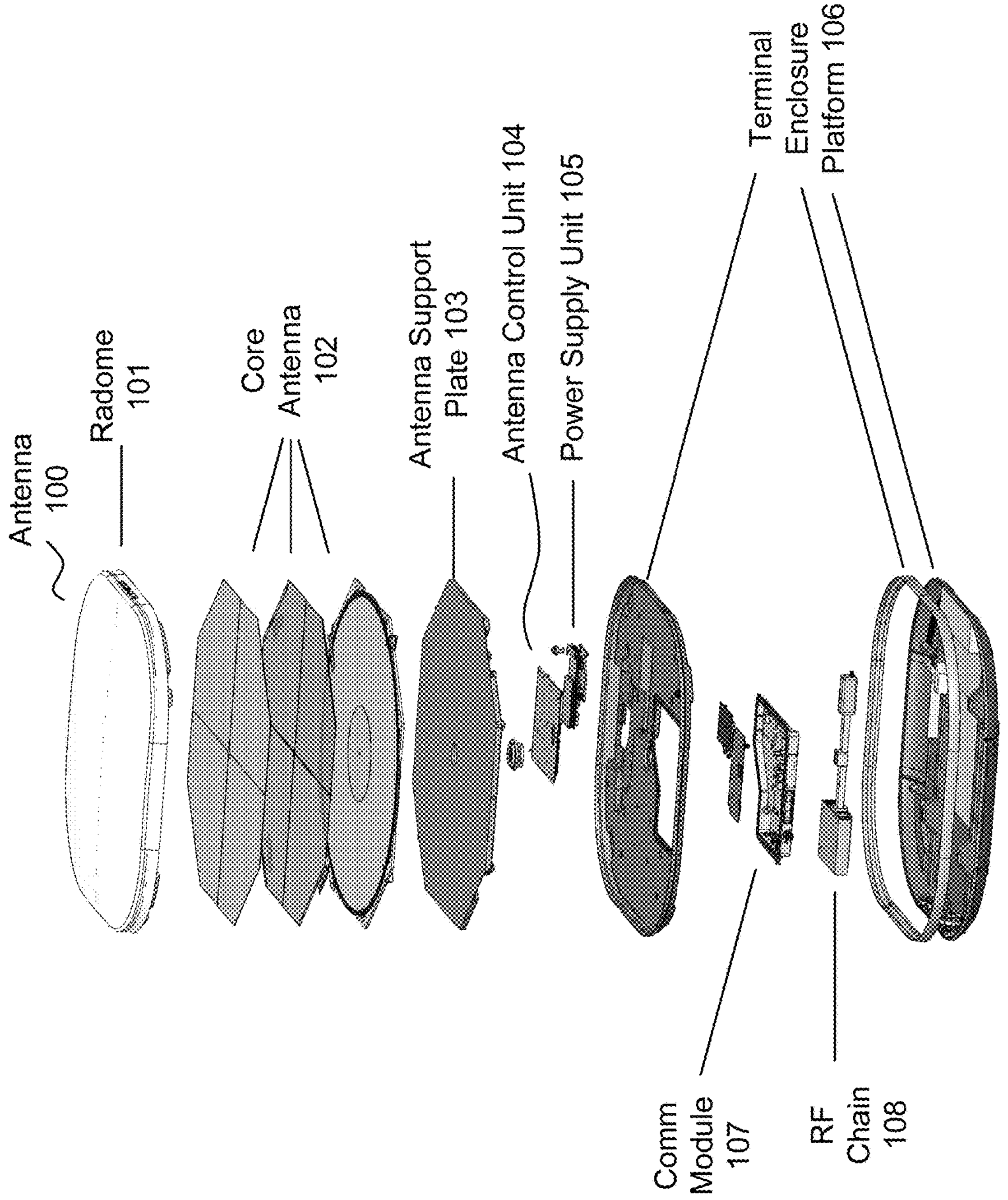
FIG. 1 illustrates an exploded view of some embodiments of a flat-panel antenna.

In the following description, numerous details are set forth to provide a more thorough explanation of embodiments of the present disclosure. It will be apparent, however, to one skilled in the art, that the teachings disclosed herein may be practiced without these specific details. In other instances, well-known structures and devices are shown in block diagram form, rather than in detail, in order to avoid obscuring the present disclosure.

Embodiments described herein include an antenna having radio-frequency (RF) radiating antenna elements that each include a fixed capacitor, such as, for example, a metal-insulator-metal (MIM) capacitor. In some embodiments, the fixed capacitor (e.g., MIM capacitor) operates in conjunction with a tuning element (e.g., a varactor) to control an RF radiating antenna element. In some embodiments, the antenna is part of a satellite user terminal. In some embodiments, the antenna is a metamaterial antenna with RF radiating antenna elements such as, for example, described below. In some other embodiments, the antenna is a phased array antenna with RF radiating antenna elements. The teachings herein are not limited to metasurface or phased array antennas and can be applied to other types of antennas.

The following disclosure discusses examples of antenna embodiments followed by examples of a description of techniques related to the role of a MIM capacitor on antennas such as metasurface antennas, including its impact on high input RF power of the RF signal source for such antennas, including transmit (TX) input power on the TX radiating elements and the effect of TX power on the receive (RX) radiating elements.

Examples of Antenna Embodiments

The techniques described herein may be used with a variety of flat panel satellite antennas. Some embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Pat. No. 11,489,266, entitled "Metasurface Antennas Manufactured with Mass Transfer Technologies," issued Nov. 1, 2022. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, micro-electromechanical systems (MEMS) devices, or other tunable capacitance devices, could be placed into an antenna aperture or elsewhere in variations on the embodiments described herein.

Although embodiments in this disclosure may draw on some examples in communications, some embodiments could be implemented in various receiving, transmitting, and/or sensing or other similar applications. Some examples could include devices for radar, lidar, sensors and sensing device such as, but not limited to, those in autonomous vehicles applications, and any other applications that can take advantage of attributes of an active metasurface according to various disclosed and undisclosed embodiments of the present disclosure.

In some embodiments, the antenna aperture having the one or more arrays of antenna elements is comprised of multiple segments that are coupled together. In some embodiments, when coupled together, the combination of the segments form groups of antenna elements (e.g., closed rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $f=1/2\pi\sqrt{LC}$ where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Pat. No.

11,489,266, entitled "Metasurface Antennas Manufactured with Mass Transfer Technologies," issued Nov. 1, 2022. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor (s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QOS) metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
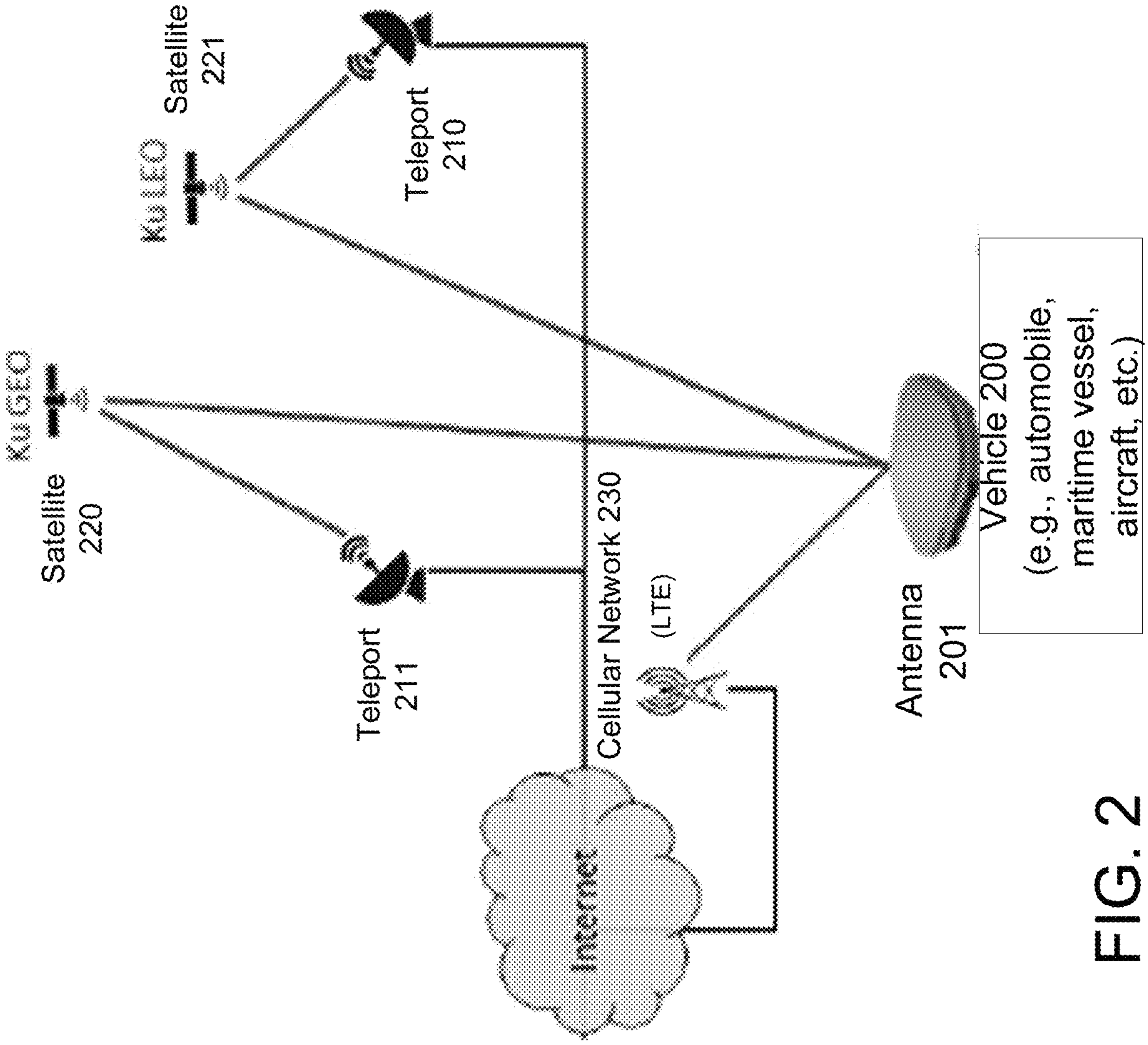
FIG. 2 illustrates an example of a communication system that includes one or more antennas according to some embodiments.

FIG. 2 illustrates an example of a communication system that includes one or more antennas described herein. Referring to FIG. 2, vehicle 200 includes an antenna 201. In some embodiments, antenna 201 comprises antenna 100 of FIG. 1. In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communication with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. Pat. No. 11,818,606, entitled "Multiple Aspects of Communication in a Diverse Communication Network", and issued Nov. 14, 2023.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communication with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. After establishing communication with satellite 221, antenna 201 stops generating the first beam to end communication with satellite 220 while switching over to communicate with satellite 221 using the second beam. For more information on multi-beam communication, see U.S.

Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221.

Thus, the antennas described herein may be part of a satellite terminal that enables ubiquitous communications and multiple different communication connections. In some embodiments, antenna 201 comprises a metasurface RF antenna having multiple RF radiating antenna elements that are tuned to desired frequencies using RF antenna element drive circuitry. The drive circuitry can include a drive transistor (e.g., a thin film transistor (TFT) (e.g., CMOS, NMOS, etc.), low or high temperature polysilicon transistor, memristor, etc.), a Microelectromechanical systems (MEMS) circuit, or other circuit for driving a voltage to an RF radiating antenna element. In some embodiments, the drive circuitry comprises an active-matrix drive. In some embodiments, the frequency of each antenna element is controlled by an applied voltage. In some embodiments, this applied voltage is also stored in each antenna element (pixel circuit) until the next voltage writing cycle.

Fixed Capacitor-Based Compensation for Non-Linear Harmonic Generation in Antennas Embodiments described herein include is a device and method for compensating for known issues with non-linear harmonic generation and self-tuning when using tuning elements, such as, but not limited to, varactor diodes in radio-frequency (RF) circuits, in antennas, such as, for example, the antennas described above. In some embodiments, the device comprises a fixed capacitor, such as a metal-insulator-metal (MIM) fixed capacitor, in series with the varactor diode. In some embodiments, the antenna comprises an aperture having RF radiating antenna elements where each of the RF radiating plurality of antenna elements includes a slot, a tuning element to tune the slot as part of the RF radiating antenna elements generating beams as described above, and a fixed capacitor (e.g., a MIM capacitor) coupled in series with the tuning element across the slot. In some embodiments, the tuning element and fixed capacitor are in an integrated circuit (IC) die. The fixed capacitor causes the RF radiating antenna elements to operate more linearly (i.e., have an improved linear response). In some embodiments, this is accomplished by having the fixed capacitor mitigate harmonic generation.

In some embodiments, the metal-insulator-metal (MIM) capacitor is made entirely of thin film materials, e.g., metals and insulators. MIM capacitors can be fabricated on a wide variety of flexible substrate or on top of Complementary metal-oxide-semiconductor (CMOS) circuitry. In some embodiments, the MIM capacitor is sized appropriately to maintain an overall higher q-factor for the antenna element (e.g., a slot and die with a tuning element and the capacitor, etc.) and to have a majority of the RF voltage drop over itself, rather than the varactor diode. In this way, the harmonic generation and self-tuning caused by high RF input power can be largely mitigated.

There are many innovations disclosed herein, including, but not limited to, the role of a MIM fixed capacitor on high RF input signal power (from the RF signal source) associated with the transmit (TX) power on the TX radiating antenna elements that transmit signals and the effect of TX power on the receive (RX) radiating elements that receive signals. For example, for an antenna operating in the Ka-band, when the number of TX slots is 80,000 and the antenna input power exceeds 16 W, including, but not limited to, in the kilowatt range, the MIM capacitor plays a key role in moderating the RF power from the RF input signal on the varactor in both ON and OFF states, where the ON state is where there is a DC voltage on the varactor and the OFF state where there is no DC voltage on the varactor. In the case where the varactor (tuning element) and MIM capacitor are in the same die, this voltage on the varactor is the voltage received each die is associated with a portion of the input TX power of the RF input signal from the RF signal source.

Figure 3:
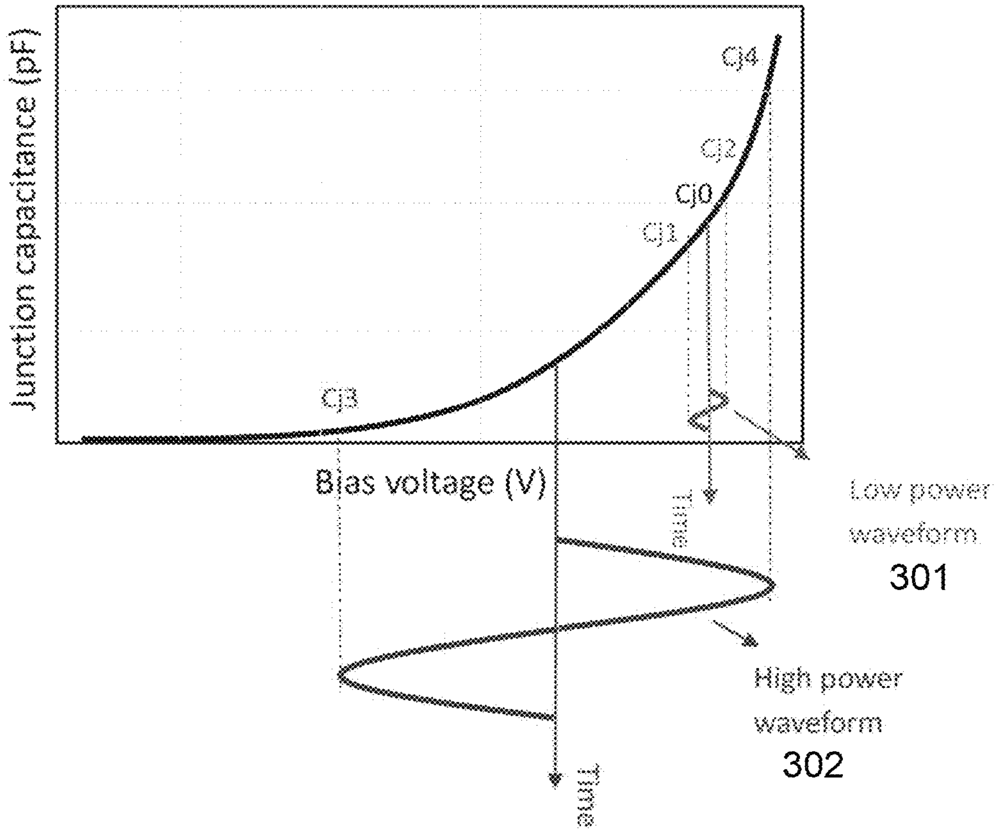
FIG. 3 shows the capacitance-voltage (CV) curve of some embodiments of a varactor diode.

FIG. 3 shows the capacitance-voltage (CV) curve of some embodiments of a varactor diode. Referring to FIG. 3, when the magnitude of the AC/injecting signal is relatively small, the voltage swing of a low power waveform 301 only covers the region from Cj1 to Cj2 where both values Cj1 and Cj2 are very close to Cj0. Nonetheless, when the magnitude of the RF/injecting signal is relatively large, the high power waveform 302 swings from a low capacitance of value Cj3 up to a high value Cj4. This suggests that the effective capacitance should no longer be assumed to be Cj0. In other words, a lower power waveform 301 is a safe mode and cannot change the varactor capacitance significantly, while the high-power waveform 302 is critical and can change the varactor capacitance significantly.

To compensate for the effect of input RF power in large metasurface array, particularly when both RF and DC voltages are received with each varactor in the coupled to TX and RX slots to tune the RF radiating antenna elements, a fixed capacitor (e.g., a MIM capacitor) compensates for the non-linearity/harmonic generation that occurs. Advantages of the MIM specifically in this context can be summarized as: improving the linearity of the system, reducing the capacitance variation of the varactor in situations in which transmitting with TX high power, and reducing the capacitance variation on the varactor of RX antenna elements when TX radiating antenna element are radiating the high power.

Referring back to FIG. 3, in circuit-design of some embodiments of the die containing the varactor coupled in series with the varactor, for a high power waveform, the RF power received with each TX-element does not influence on the capacitance on the varactor even though the capacitance of the varactor is changed with the DC voltage applied by a driver (e.g., a matrix drive driver, etc.) of the varactor. This is because of the use of a MIM (fixed) capacitor coupled in series with the varactor.

Figure 4:
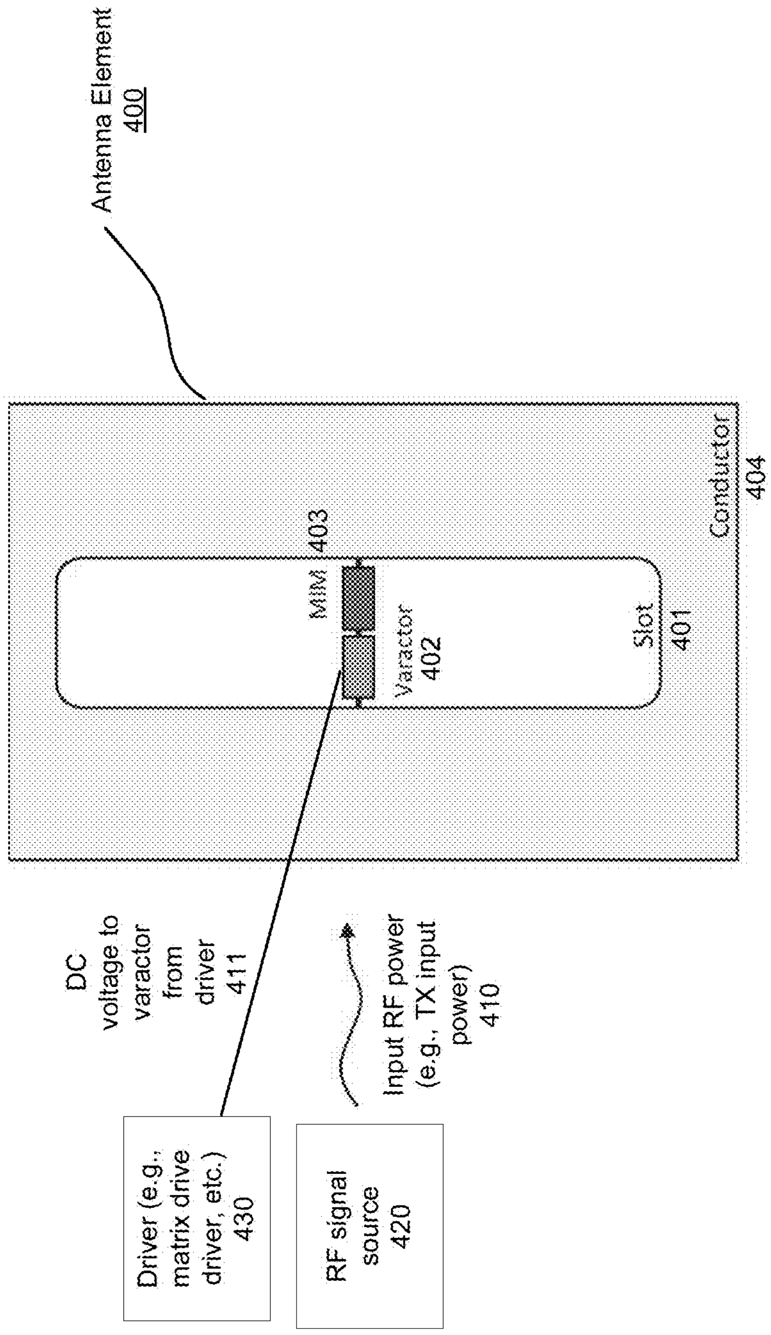
FIG. 4 illustrates some embodiments of a RF radiating antenna element with a placement of a varactor and the MIM capacitor on each slot (iris).

FIG. 4 illustrates some embodiments of a RF radiating antenna element with a placement of a varactor and the MIM capacitor on each slot (iris). Referring to FIG. 4, the antenna element 400 includes a slot 401. Slot 401 has a long, narrow section (i.e., an elongated section extending vertically in FIG. 4) having a width (extending horizontally in FIG. 4). A varactor 402 is coupled in series with MIM capacitor 403 across the width of slot 401. In some embodiments, varactor 402 is connected serially with MIM capacitor 403. In some embodiments, the coupling of varactor 402 and MIM capacitor 403 is at a center or central portion of slot 401. In some embodiments, the size of MIM for both RX and TX differs from each other. In some embodiments, for the TX part, the size of MIM can range from hundreds of femtofarads (fF). In the Ka-band, when the number of TX slots is 80,000 and the antenna input power exceeds 16 W, the MIM plays a key role in moderating the voltage on the varactor from the RF signal input power from the RF signal source in both ON and OFF states.

In some other embodiments, the coupling of varactor 402 and MIM capacitor 403 is at other places along slot 401 (e.g., approximately one-quarter of the way from the top or bottom of slot 401. In some embodiments, varactor 402 and MIM capacitor 403 are contained in an integrated circuit (IC) die that is coupled across slot 401 with MIM capacitor 403 considered as a fixed capacitor in a die design. MIM capacitor 403 is a linear device and varactor 402 is a non-linear device. While the antenna element of FIG. 4 shows the use of a MIM capacitor, other types of fixed capacitors can be used to cause the RF radiating antenna elements as well as the entire TX system to operate in a more linear fashion by mitigating the generation of harmonics.

Antenna element 400 receives input RF signal power 410 from an RF signal source 420. RF signal power 410 represents the TX input power received by antenna element 400. Varactor 402 also receives DC voltage/power. In some embodiments, the DC voltage comprises a DC voltage 411 from a driver 430 (e.g., a driver of a matrix drive) used for controlling varactor 402 as a tuning element.

Figure 5:
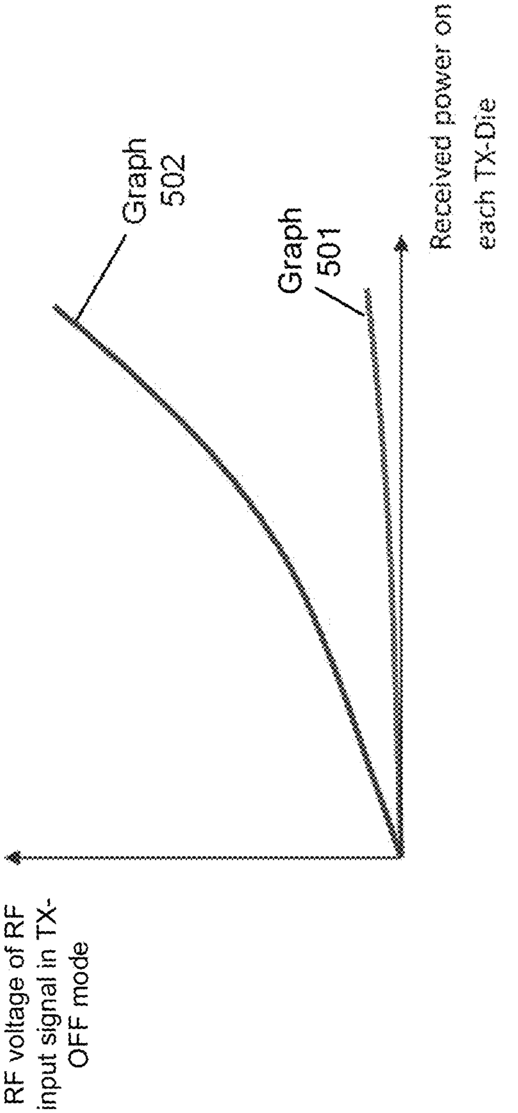
FIG. 5 illustrates a graph of the RF signal source voltage received by a varactor and the MIM in the OFF mode of TX elements.

FIG. 5 illustrates a graph of the RF voltage of the RF signal received by a varactor and the MIM in the OFF mode [lower band] of TX elements. In the OFF mode, there is no DC voltage on the varactor and the TX antenna elements are off. Referring to FIG. 5, the graph is a plot of the RF voltage of the RF signal received by the varactor on the horizontal axis versus the power received on each TX-die containing a varactor coupled across the slot of the antenna element on the vertical axis. Graph 501 illustrates the received power on each Tx-die that is coupled across the slot and that contains a varactor, and graph 502 illustrates the received power on each TX-die that is coupled across the slot and that contains a varactor and a MIM capacitor connected in series with the varactor. As shown in the graph in FIG. 5, in the OFF mode, beneficially, the value of the series MIM capacitor is almost 10 times smaller than the varactor capacitance, and then most of RF voltage will be impacted by the MIM capacitor (as the RF voltage increases), and not the varactor.

Figure 6:
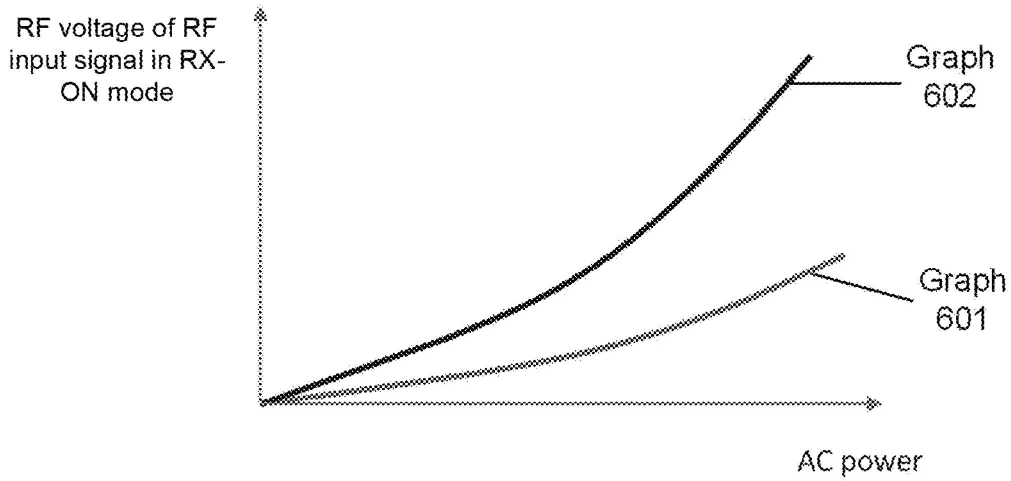
FIG. 6 illustrates the RF signal source voltage received by the varactor and the MIM in the ON mode of RX elements.

FIG. 6 illustrates the RF voltage of the RF signal received by the varactor and the MIM in the ON mode [higher band] of RX elements. In the ON mode, there is a DC voltage on the varactor and the RX antenna elements are on. Referring to FIG. 6, the graph is a plot of the RF voltage of the RF signal received by the varactor on the horizontal axis versus the power received on each RX-die containing a varactor coupled across the slot of the antenna element on the vertical axis. Graph 601 illustrates the received power on each RX-die that is coupled across the slot and that contains a varactor, and graph 602 illustrates the received power on each RX-die that is coupled across the slot and that contains a varactor and a MIM capacitor connected in series with the varactor. As shown in the graph in FIG. 6, in the ON mode, beneficially, the value of the series MIM capacitor is at least ten times smaller than the varactor capacitance, and then most of RF voltage of the input RF signal will be impacted by the MIM capacitor (as the RF input power increases), and not the varactor. For example, in the OFF mode, with the value of series MIM being almost ten times smaller than varactor capacitance, then most of RF voltage of the input RF signal will be seen with MIM, and not varactor.

Figure 7:
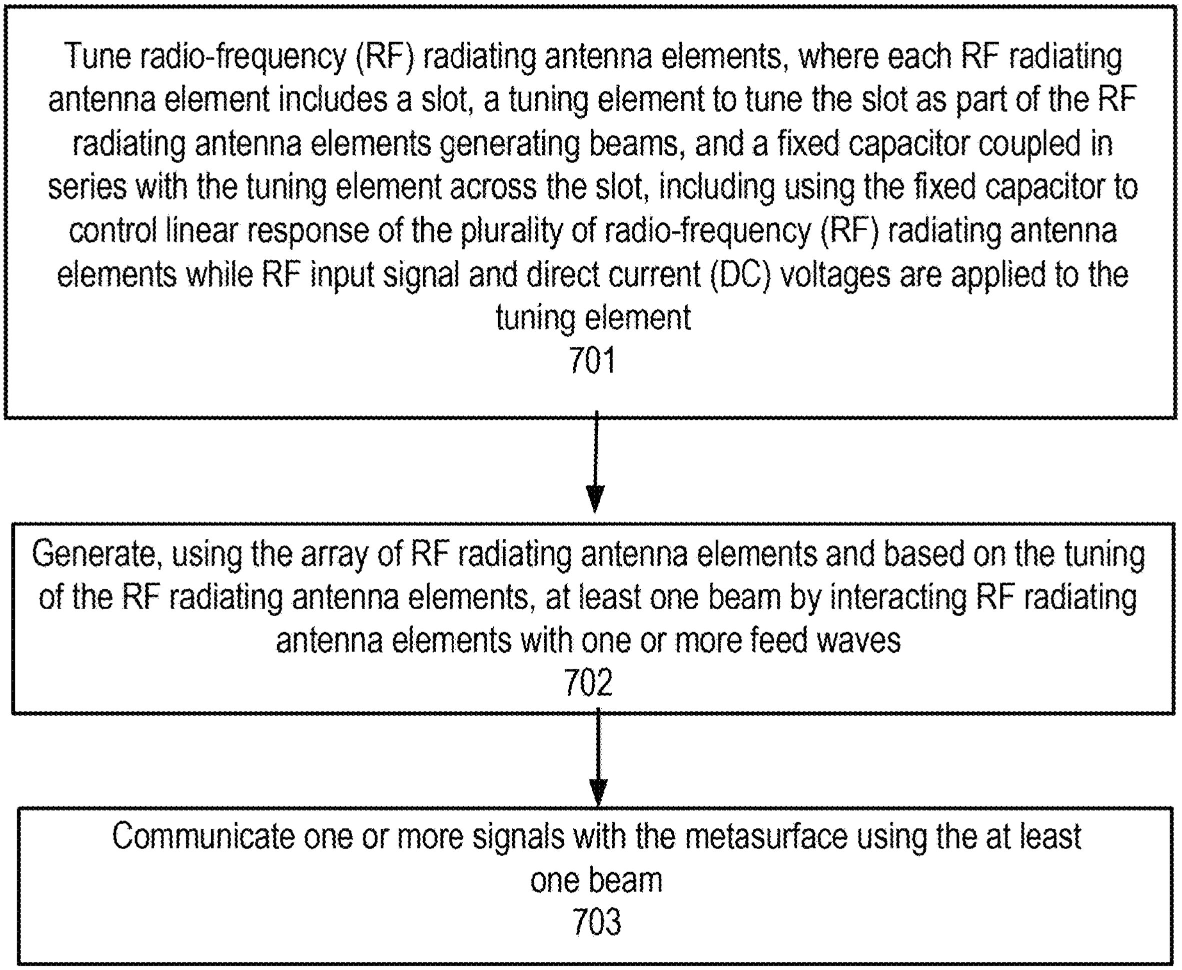
FIG. 7 is a flow diagram of some embodiments of a process communicating with a metasurface antenna.

FIG. 7 is a flow diagram of some embodiments of a process communicating with a metasurface antenna. Referring to FIG. 7, the process begins by tuning radio-frequency (RF) radiating antenna elements of an array of RF radiating antenna elements in a metasurface, where each RF radiating antenna element includes a slot, a tuning element to tune the slot as part of the RF radiating antenna elements generating beams, and a fixed capacitor coupled in series with the tuning element across the slot (processing block 701). The tuning the RF radiating antenna elements in a metasurface includes using the fixed capacitor to control linear response of the radiating antenna elements and the system while RF input signal and direct current (DC) voltages are applied to the tuning element.

The process also includes generating, using the array of RF radiating antenna elements and based on the tuning of the RF radiating antenna elements, at least one beam by interacting RF radiating antenna elements with one or more feed waves (processing block 702) and communicating one or more signals with the metasurface using the at least one beam (processing block 703).

As discussed above, the techniques described herein are not limited to metasurface antennas with metamaterial antenna elements. In some embodiments, the antenna is a phased array antenna that includes phase shifters with varactor diodes and fixed, or static, capacitors. For example, core antenna 102 can alternatively have RF radiating antenna elements with such phase shifters.

In some embodiments, the phase shifters of such a phased array antenna include loaded line phase shifters. In such a case, in some embodiments, the phased array antenna includes multiple signal lines and a plurality of phase shifters. Each phase shifter is coupled to one of these signal lines and includes a plurality of ground planes, and a plurality of loading components coupling the one signal line to the pair of group planes at periodic locations along the one signal line, wherein each of the plurality of loading components comprises a tuning varactor coupled in series with a fixed capacitor (e.g., a MIM capacitor, etc.).

Figure 8:
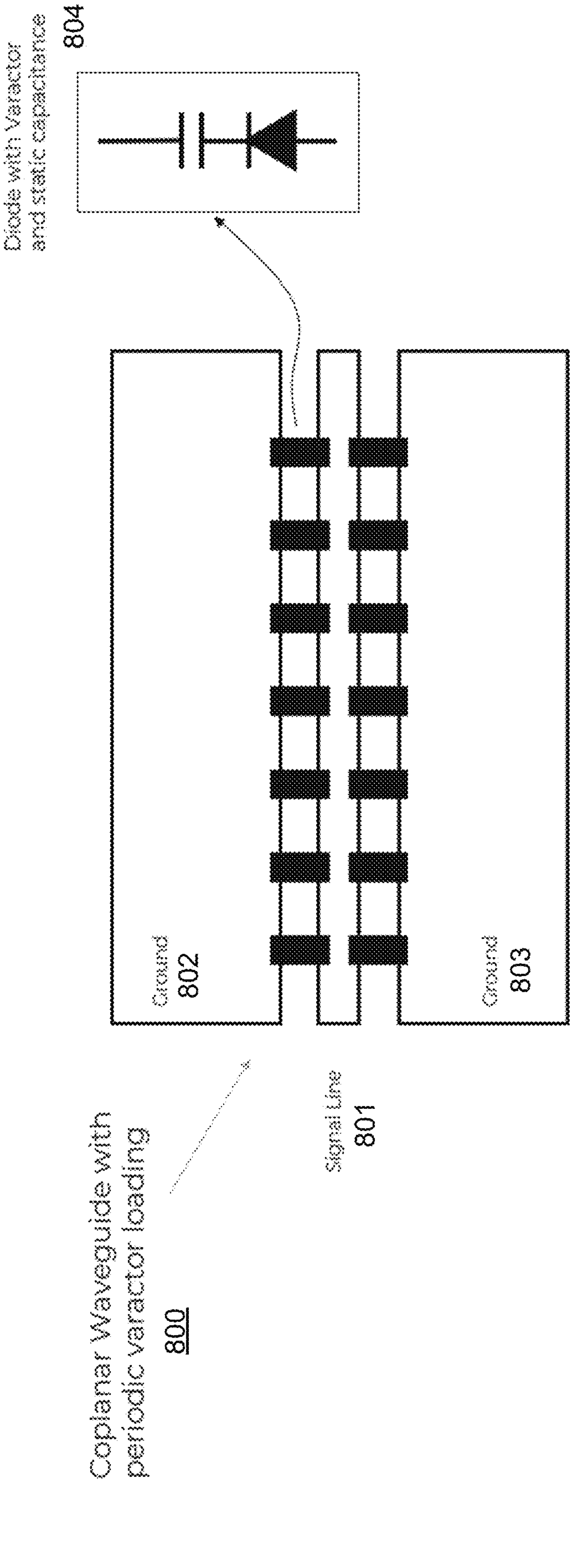
FIG. 8 illustrates some embodiments of a loaded line phase shifter of a phased array antenna.

FIG. 8 illustrates some embodiments of a loaded line phase shifter of a phased array antenna. In some embodiments, the load line phase shifter has loading components each having a series combination of a varactor and a fixed (static) capacitor (e.g., a MIM capacitor).

Referring to FIG. 8, a coplanar waveguide 800 includes periodic varactor loading. A signal line 801 is between two grounds 802 and 803. Signal line 801 periodically coupled to grounds 802 and 803 via a varactor diode in series with a static capacitance 804. In other words, varactor diode with series coupled static capacitance 804 periodically couples at points along signal line 801 to grounds 802 and 803, such that the phase shifter represents a periodically loaded line with varactors. In this manner, the phased array antenna uses varactor diodes that with improved linearization over those that do not include the varactor with a fixed (static) capacitor.

In summary, when using a varactor as a tuning element, a fixed capacitor (a MIM capacitor) is added in series to compensate for when both RF input signal and DC voltages are received with each varactor (tuning element) on the TX and RX dies that are coupled across slots of the metamaterial antenna elements. This provides a number of advantages to embodiments disclosed herein including: improving the linearity of the TX system including the RF radiating elements, reducing the capacitance variation of the varactor in TX high power, and reducing the capacitance variation on the varactor-RX elements when TX elements are radiating the high power.

There are a number of example embodiments described herein.

Example 1 is an antenna comprising: a radio-frequency (RF) signal source; a plurality of radio-frequency (RF) radiating antenna elements coupled to the RF signal source, wherein each of the RF radiating antenna elements comprises a slot, a tuning element coupled to the RF signal source and to tune the slot as part of the RF radiating antenna elements generating beams, and a fixed capacitor coupled to the RF signal source and coupled in series with the tuning element across the slot, the fixed capacitor to mitigate harmonic generation in order to control linear response of the plurality of radio-frequency (RF) radiating antenna elements.

Example 2 is the antenna of example 1 that may optionally include that the fixed capacitor comprises a metal-insulator-metal (MIM) capacitor.

Example 3 is the antenna of example 2 that may optionally include that the MIM capacitor and the tuning element are part of a die.

Example 4 is the antenna of example 1 that may optionally include that the tuning element comprises a varactor.

Example 5 is the antenna of example 1 that may optionally include that the fixed capacitor is operable to mitigate harmonic generation when RF power of the RF signal source received by the tuning element increases in different modes.

Example 6 is the antenna of example 1 that may optionally include that the fixed capacitor is operable to reduce capacitance variation on the tuning elements of a first set of receive (RX) RF radiating antenna elements of plurality of RF radiating antenna elements while transmit (TX) RF radiating antenna elements of plurality of RF radiating antenna elements are radiating.

Example 7 is the antenna of example 1 that may optionally include that the tuning element has a control input to receive a direct current (DC) control signal.

Example 8 is the antenna of example 1 that may optionally include that the plurality of antenna elements is part of a metasurface.

Example 9 is the antenna of example 1 that may optionally include that the plurality of RF radiating antenna elements are part of a metasurface.

Example 10 is an antenna comprising: a radio-frequency (RF) signal source; a plurality of RF radiating antenna elements coupled to the RF signal source, wherein each RF radiating antenna element of the plurality of RF radiating antenna elements comprises a slot, a die coupled to the slot and the RF signal source, wherein the die comprises a tuning element coupled in series with a fixed capacitor and the series-coupled tuning element and fixed capacitor are coupled across the slot, wherein the tuning element is operable to tune the slot based on a direct current (DC) control signal when the RF radiating antenna elements generated beams and the fixed capacitor is operable to cause an improved linear response by each RF antenna element when its associated tuning element receives an AC voltage from the RF signal source and a DC voltage associated with the DC control signal.

Example 11 is the antenna of example 10 that may optionally include that the fixed capacitor comprises a metal-insulator-metal (MIM) capacitor.

Example 12 is the antenna of example 10 that may optionally include that the tuning element comprises a varactor.

Example 13 is the antenna of example 10 that may optionally include that the fixed capacitor is operable to mitigate harmonic generation when RF power of the RF signal source received by the tuning element increases in different modes.

Example 14 is the antenna of example 10 that may optionally include that the fixed capacitor is operable to reduce capacitance variation on the tuning elements of a first set of receive (RX) RF radiating antenna elements of plurality of RF radiating antenna elements while transmit (TX) RF radiating antenna elements of plurality of RF radiating antenna elements are radiating.

Example 15 is the antenna of example 10 that may optionally include that the plurality of antenna elements is part of a metasurface.

Example 16 is a method comprising: tuning radio-frequency (RF) radiating antenna elements of an array of RF radiating antenna elements in a metasurface, each RF radiating antenna element comprising a slot, a tuning element to tune the slot as part of the RF radiating antenna elements generating beams, and a fixed capacitor coupled in series with the tuning element across the slot, wherein tuning the RF radiating antenna elements of an of RF radiating antenna elements in a metasurface comprises using the fixed capacitor to control linear response of the plurality of radio-frequency (RF) radiating antenna elements while an RF signal and direct current (DC) voltages are applied to the tuning element; and generating, using the array of RF radiating antenna elements and based on the tuning of the RF radiating antenna elements, at least one beam by interacting RF radiating antenna elements with one or more feed waves; and communicating one or more signals with the metasurface using the at least one beam.

Example 17 is the method of example 16 that may optionally include that the fixed capacitor comprises a metal-insulator-metal (MIM) capacitor.

Example 18 is the method of example 17 that may optionally include that the MIM capacitor and the tuning element are part of a die.

Example 19 is the method of example 16 that may optionally include that the tuning element comprises a varactor.

Example 20 is the method of example 16 that may optionally include that the fixed capacitor is operable to control the linear response of the tuning element as RF power of the RF signal received by the RF radiating antenna element in different modes.

Example 21 is a phased array antenna comprising: a plurality of signal lines; a plurality of phase shifters, each phase shifter of the plurality of phase shifters coupled to one signal line of the plurality of signal lines and comprising a plurality of ground planes, and a plurality of loading components coupling the one signal line to the pair of group planes at periodic locations along the one signal line, wherein each of the plurality of loading components comprises a tuning varactor coupled in series with a fixed capacitor.

Example 22 is the method of example 21 that may optionally include that the fixed capacitor comprises a MIM capacitor.

Methods and tasks described herein may be performed and automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna comprising:
- a radio-frequency (RF) signal source;
- a plurality of radio-frequency (RF) radiating antenna elements coupled to the RF signal source, wherein each of the RF radiating antenna elements comprises
  - a slot,
  - a tuning element coupled to the RF signal source and to tune the slot as part of the RF radiating antenna elements generating beams, and
  - a fixed capacitor coupled to the RF signal source and coupled in series with the tuning element across the slot, the fixed capacitor to mitigate harmonic generation in order to control linear response of the plurality of radio-frequency (RF) radiating antenna elements.

2. The antenna of claim 1 wherein the fixed capacitor comprises a metal-insulator-metal (MIM) capacitor.

3. The antenna of claim 2 wherein the MIM capacitor and the tuning element are part of a die.

4. The antenna of claim 1 wherein the tuning element comprises a varactor.

5. The antenna of claim 1 wherein the fixed capacitor is operable to mitigate harmonic generation when RF power of the RF signal source received by the tuning element increases in different modes.

6. The antenna of claim 1 wherein the fixed capacitor is operable to reduce capacitance variation on the tuning elements of a first set of receive (RX) RF radiating antenna elements of plurality of RF radiating antenna elements while transmit (TX) RF radiating antenna elements of plurality of RF radiating antenna elements are radiating.

7. The antenna of claim 1 wherein the tuning element has a control input to receive a direct current (DC) control signal.

8. The antenna of claim 1 wherein the plurality of antenna elements is part of a metasurface.

9. The antenna of claim 1 wherein the plurality of RF radiating antenna elements are part of a metasurface.

10. An antenna comprising:

a radio-frequency (RF) signal source;

a plurality of RF radiating antenna elements coupled to the RF signal source, wherein each RF radiating antenna element of the plurality of RF radiating antenna elements comprises a slot, a die coupled to the slot and the RF signal source, wherein the die comprises a tuning element coupled in series with a fixed capacitor and the series-coupled tuning element and fixed capacitor are coupled across the slot, wherein the tuning element is operable to tune the slot based on a direct current (DC) control signal when the RF radiating antenna elements generated beams and the fixed capacitor is operable to cause an improved linear response by each RF antenna element when its associated tuning element receives an AC voltage from the RF signal source and a DC voltage associated with the DC control signal.

11. The antenna of claim 10 wherein the fixed capacitor comprises a metal-insulator-metal (MIM) capacitor.

12. The antenna of claim 10 wherein the tuning element comprises a varactor.

13. The antenna of claim 10 wherein the fixed capacitor is operable to mitigate harmonic generation when RF power of the RF signal source received by the tuning element increases in different modes.

14. The antenna of claim 10 wherein the fixed capacitor is operable to reduce capacitance variation on the tuning elements of a first set of receive (RX) RF radiating antenna elements of plurality of RF radiating antenna elements while transmit (TX) RF radiating antenna elements of plurality of RF radiating antenna elements are radiating.

15. The antenna of claim 10 wherein the plurality of antenna elements is part of a metasurface.

16. A method comprising:

tuning radio-frequency (RF) radiating antenna elements of an array of RF radiating antenna elements in a metasurface, each RF radiating antenna element comprising a slot, a tuning element to tune the slot as part of the RF radiating antenna elements generating beams, and a fixed capacitor coupled in series with the tuning element across the slot, wherein tuning the RF radiating antenna elements of an of RF radiating antenna elements in a metasurface comprises using the fixed capacitor to control linear response of the plurality of radio-frequency (RF) radiating antenna elements while an RF signal and direct current (DC) voltages are applied to the tuning element; and generating, using the array of RF radiating antenna elements and based on the tuning of the RF radiating antenna elements, at least one beam by interacting RF radiating antenna elements with one or more feed waves; and communicating one or more signals with the metasurface using the at least one beam.

17. The method of claim 16 wherein the fixed capacitor comprises a metal-insulator-metal (MIM) capacitor.

18. The method of claim 17 wherein the MIM capacitor and the tuning element are part of a die.

19. The method of claim 16 wherein the tuning element comprises a varactor.

20. The method of claim 16 wherein the fixed capacitor is operable to control the linear response of the tuning element as RF power of the RF signal received by the RF radiating antenna element in different modes.

* * * * *